United States Patent
Brock

[19]
[11] Patent Number: 6,125,525
[45] Date of Patent: Oct. 3, 2000

[54] UNIVERSAL SCREEN GUARD CLIP

[76] Inventor: Dwight L. Brock, 213A Dunn Rd., Fayetteville, N.C. 28301

[21] Appl. No.: 09/323,290

[22] Filed: Jun. 1, 1999

Related U.S. Application Data

[60] Provisional application No. 60/093,312, Jul. 17, 1998.

[51] Int. Cl.[7] .............................. B23P 11/00; B23P 17/00
[52] U.S. Cl. ...................... 29/525.01; 348/823; 348/834; 29/450
[58] Field of Search ................................. 29/450, 525.01; 348/834, 823; 359/609

[56] References Cited

U.S. PATENT DOCUMENTS

| | | | |
|---|---|---|---|
| 2,596,710 | 5/1952 | Moricco et al. | |
| 2,692,983 | 10/1954 | Eisenkramer | 312/7.2 X |
| 2,992,872 | 7/1961 | Bateman et al. | 348/836 X |
| 3,084,217 | 4/1963 | Fiore et al. | 348/823 |
| 4,427,264 | 1/1984 | Kamerling | 358/252 |
| 4,907,090 | 3/1990 | Ananian | |
| 5,119,271 | 6/1992 | Aoki et al. | 361/682 |
| 5,155,627 | 10/1992 | Keehn et al. | 359/609 |
| 5,227,916 | 7/1993 | Theirl et al. | 359/609 |
| 5,592,241 | 1/1997 | Kita et al. | 348/823 |

*Primary Examiner*—David P. Bryant
*Assistant Examiner*—Jermie E. Cozart
*Attorney, Agent, or Firm*—Mills Law Firm PLLC

[57] ABSTRACT

The present invention is a universal screen guard clip for projection type television sets. These clips are extruded and can be inserted between the projection screen and the front frame in various manners, depending on the configuration of the particular television on which the screen guard is being placed. The screen guard clip of the present invention is arcuate shaped in cross-section and is curved back on itself along one edge. A longitudinal locking tab is also provided to make the screen guard clip even more universal.

8 Claims, 10 Drawing Sheets

UNIVERSAL SCREEN GUARD CLIP

RELATED APPLICATION

The present application claims the benefit under 35 USC 120 of U.S. Provisional Application No. 60/093,312 filed on Jul. 17, 1998 in the name of Dwight L. Brook and entitled "Universal Screen Guard Clip".

BACKGROUND OF INVENTION

1. Field of Invention

This invention relates to projection type television screens and more particularly to an improved screen guard clip and method of mounting such protective guard on the various types of televisions.

Protective screen guards for projection-type televisions or so-called Big Screen TV's are well known to those skilled in the art. Such a screen guard is fabricated from a sheet of transparent plastic and dimensioned to closely fit within a peripheral frame of the television screen.

The screen guard is typically installed by means of a screen guard clip which engages both the edges of the screen guard and the edges of the screen frame to secure it in position.

A problem arises during the installation of after-market screen guards in that a screen guard clip for a Sony television, for example, will not properly fit onto a Mitsubishi or Zenith screen frame, etc.

2. Concise Explanation of Prior Art

U.S. Pat. No. 2,596,710 to John A. Moricco et al. of Brooklyn, N.Y., and Gregory J. Moricco of New York, N.Y., discloses a removable panel frame for television receiving sets which include catch components 21 and 22 which, when pulled outwardly, allows the glass window to be removed.

U.S. Pat. No. 2,692,983 to Arthur Eisenkramer of Westbury, N.Y., assignor to Emerson Radio and Phonograph Corp, New York, N.Y. discloses a removable bezel and safety glass for television receivers including clips 24 which hold the safety glass in place.

U.S. Pat. No. 2,992,872 to Bryce C. Bateman of Northridge and Russell H. McDonald of Maywood, both of California assignors to Packard Bell Electronics Corp., Los Angeles, Calif. discloses a panel retaining means in the form of a retainer rail.

U.S. Pat. No. 3,084,217 to Joseph P. Fiore of Chicago and Carl J. Steinke of Des Plaines, Ill., assignors to Zenith Radio Corporation of Delaware discloses a television receiver with a safety plate that is held in place by a gasket that is inserted between the electron tube and the frame.

U.S. Pat. No. 4,907,090 to Frederick Annanian of Trabuco Canyon, Calif. discloses a projection television screen protector that uses hook and loop material to hold the same in place.

U.S. Pat. No. 5,119,271 to Satoshi Aoki et al. assignors to Matsushita Electric Industrial Co., Ltd. Kadoma, Japan discloses a projection-type television set that includes the use of leaf spring to hold the screen in place.

U.S. Pat. No. 5,155,627 to Donald L. Keehn, Healdsburg; David L. Soberanis, Santa Rosa; Russell E. Barbaria, Windsor, all of California; Assignee: Optical Coating Laboratory, Inc., Santa Rosa, Calif. discloses a universal bezel and anti-glare filter for computer and other video displays including a lip that slides onto and off the monitor and adapts to monitors of different sizes.

U.S. Pat. No. 5,227,916 to Scott G. Theirl of St. Paul, Gerald E. Drake of Oakdale, both of Minnesota, assignors to Minnesota Mining and Manufacturing Company discloses an adjustable mounting mechanism for optical screen adjustable mounting members and latch members.

Finally, U.S. Pat. No. 5,592,241 to Tetsuya Kita et al. of Japan, assignors to Sony Corporation, Tokyo, Japan discloses an attachable protective screen for image display devices and the method of installing the same including a simple base or clip that is inserted between the screen and the housing.

BRIEF DESCRIPTION OF INVENTION

After much research and study into the above mentioned problems, the present invention has been developed to provide a versatile, cost-effective method of installing after-market screen guards on projection type television screens. The present invention provides a universal fit with big screen televisions of various manufacturers to give the consumer an after-market screen guard at a reasonable price.

The above is accomplished through the provision of an arcuate clip that is rolled into an elliptical shape at one end and includes an outwardly projecting locking tab when viewed in lateral cross-section. This elongated clip is made from a material with a memory which gives a spring action when deformed to hold the screen guard in place juxtaposed to the television projection screen.

There are four clips used in the normal installation, a bottom clip, a top clip, and two side clips to cover the entire periphery of the screen guard where such periphery joins the frame for the television screen.

In view of the above it is an object of the present invention to provide a universal screen guard clip that mounts the screen guard juxtaposed to the screen.

Another objection of the present invention is to provide a universal screen guard clip that inserts between the television screen and the television frame to support a protective screen guard over said screen.

Another object of the present invention is to provide a screen guard clip that is arcuate in cross section, is extruded, and is made of a material that has a memory.

Another object of the present invention is to provide a screen guard clip that is arcuate in cross section and includes an outwardly projecting locking tab that runs the entire longitudinal length of the clip.

Other objects and advantages of the present invention will become apparent and obvious from a study of the following description and the accompanying drawings which are merely illustrative of such invention.

DETAILED DESCRIPTION OF INVENTION

Figure 1:
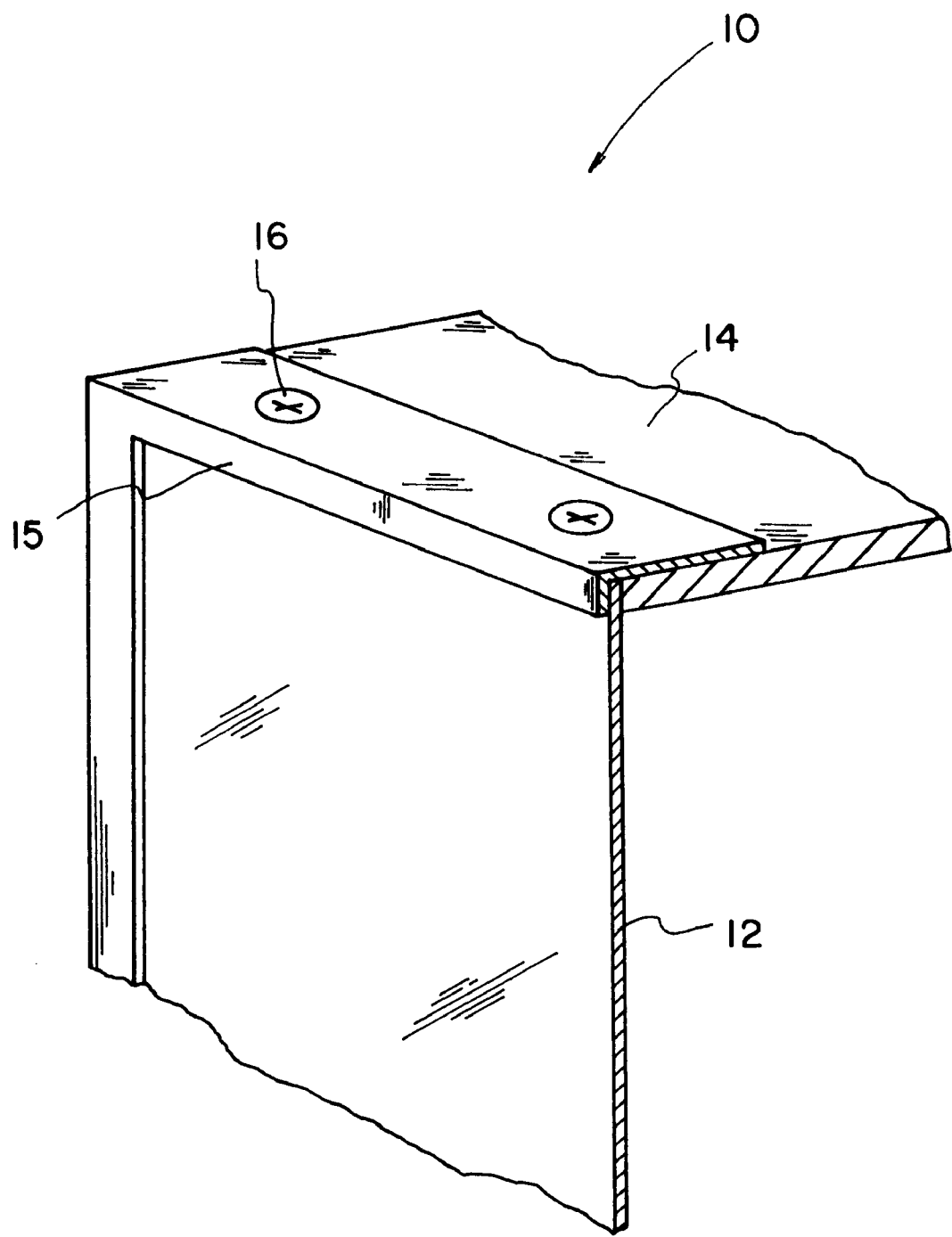
FIG. 1 is a cutaway perspective view of a prior art method of mounting a projection type television screen.

With further reference to the drawings, FIG. 1 shows a partial construction of a conventional projection-type television set, indicated generally at 10 and marked Prior Art.

In such a projection type television set, a screen 12 is installed between a frame 15 and housing 14 wherein a plurality of projection lenses and CRT displays (not shown) are provided. Frame 15 secures the screen 12 to the housing 14 being fixed thereto by screws 16 or other suitable attaching hardware.

Figure 2:
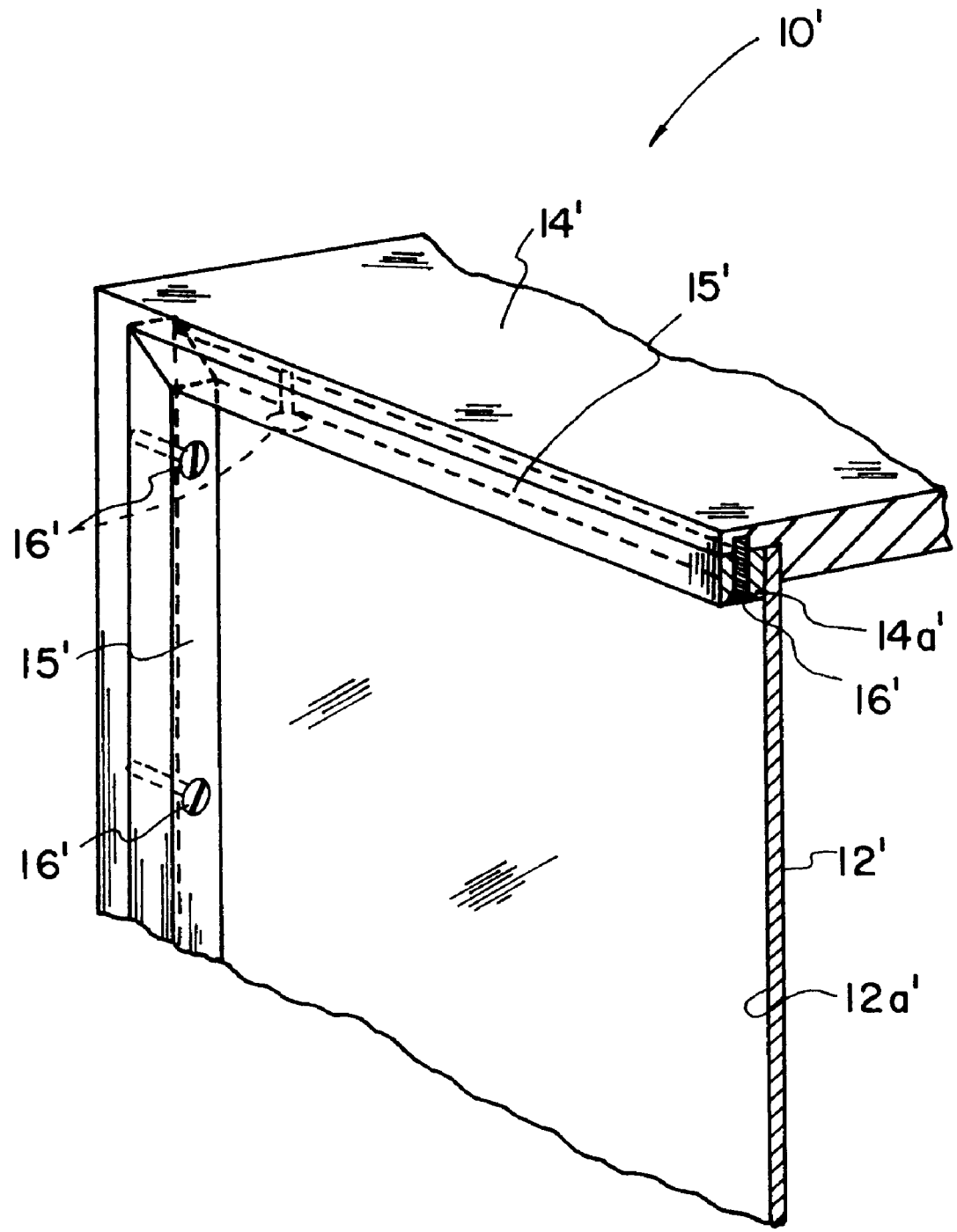
FIG. 2 is another method of mounting the prior art television screens.

In another projection-type television set 10' a screen 12' is installed on a housing 14' as shown in FIG. 2 and marked Prior Art. In this configuration the screen 12' is installed against a front offset portion 14a' of the housing 14'. The peripheral edge of a front face 12a' is held in position by frames 15', which are fixed on the housing 14' by screws 16'.

The screen 12' may be removed from the housing of 14' by reversing the procedures set forth above. However, in the above projection-type television set many screws 16' are required to secure the screen 12' on the housing 14' and, thus, extensive manual labor is necessary for mounting or removing such a screen 12'.

Due to the high cost involved in replacing a projection-type television screen, it has become commonplace in industry to install a protective screen guard over the actual television screen 12 to prevent it from being scratched or marred inadvertently.

Such a screen guard is fabricated from a sheet of transparent plastic material such as polycarbonate or other suitable material for this purpose. The screen guard may be provided by the manufacturer or may be acquired by the user as an after-market accessory item.

Figure 3:
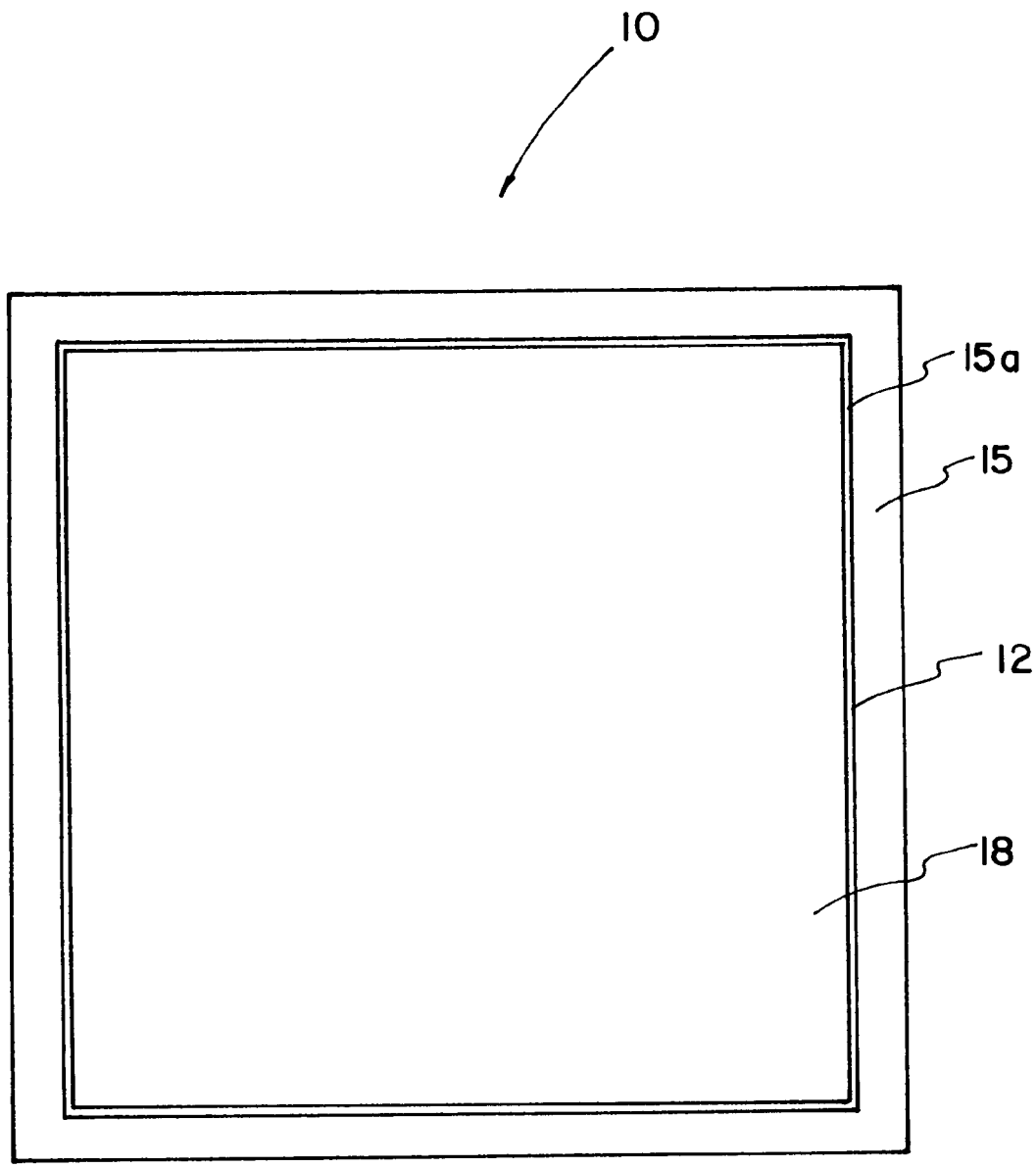
FIG. 3 is a generally schematic illustration of the placement of a screen guard over a projection type television screen.

FIG. 3 shown schematically the relative location of a typical protective screen guard 18 is installed directly onto the outwardly facing surface of the screen 12 of a projection-type television similar to that shown in FIG. 1. The screen guard 18 is dimensioned to closely fit within the inner peripheral edge 15a of the frame 15 so as to leave a gap in the range of $1/16^{th}$–$1/8^{th}$ inch.

A problem arises in securing such a screen guard 18 against the surface of the screen 12 and within the peripheral frame 15 and to which the present invention is directed.

It will be appreciated by those skilled in the art that in securing such a screen guard 18 to projection-type television screens, various fastener devices or clips have been devised to secure the screen guard 18 in position. For example, U.S. Pat. No. 5,592,241 discussed above discloses a screen protection arrangement wherein an inverted L-shaped clip is utilized for mounting the protective screen. Such a clip is inserted along a lower edge of the frame opening to provide a shelf wherein a lower edge of the protective screen guard is inserted.

However, such mounting clips are manufacturer specific in that they are compatible only with a screen and frame design of that particular manufacturer. In other words, a clip designed for use with a Zenith set cannot be used to mount a screen guard on a Pioneer set because the Pioneer set does not have the same frame design. Similarly, a Mitsubishi clip cannot be used to mount a screen guard on a RCA set because the frame design is entirely different from the Mitsubishi.

The present invention has been developed to provide a universal screen guard clip for securing a protective screen guard to big screen televisions of various manufacturers.

Figure 4:
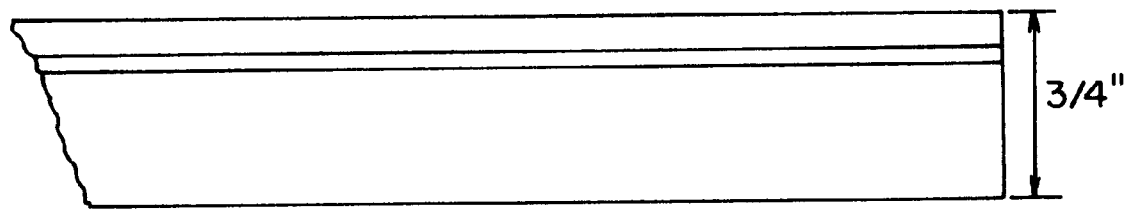
FIG. 4 is a fragmentary elevational view of one version of the present invention.
Figure 5:
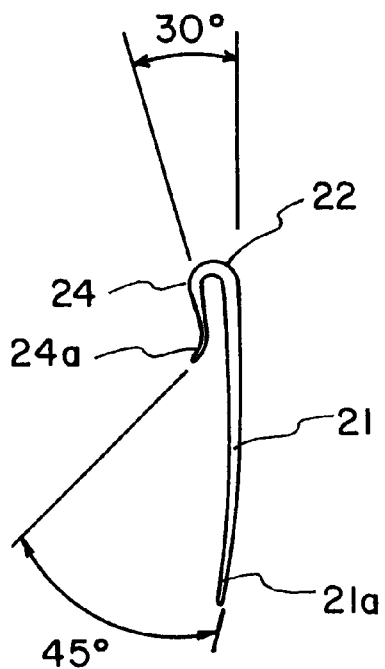
FIG. 5 is an end elevational view thereof.

As shown in FIG. 4, the present screen guard clip, indicated generally at 20, comprises an extrusion of a flexible plastic material such as polyvinylchloride NP 57, polycarbonate, or other suitable plastic material having a memory. The clip 20 is rolled or folded onto itself along a longitudinal edge thereof to the configuration shown in FIG. 5.

In this embodiment the folded portion defines a radius of approximately $1/32^{nd}$ inch as at 22. A short leg portion 24 bends downwardly converging with a plane defining the body 21 of the clip. The terminal end 24a of the short leg portion 24 bends upwardly at approximately at 45° to the horizontal plane of the body 21.

The clip 20 has a thickness of approximately $1/32^{nd}$ inch with the exception of the terminal portion 21a of the body 21 which tapers down to approximately $1/64^{th}$ inch. It will be noted that the dimensions of the clip 20 as described hereinabove are adaptable to the screen and frames of many different manufacturers. However, these dimensions are subject to modification to adapt the present clip 20 for universal application. Thus, the dimensions specified are intended as merely illustrative and not restrictive.

Figure 6:
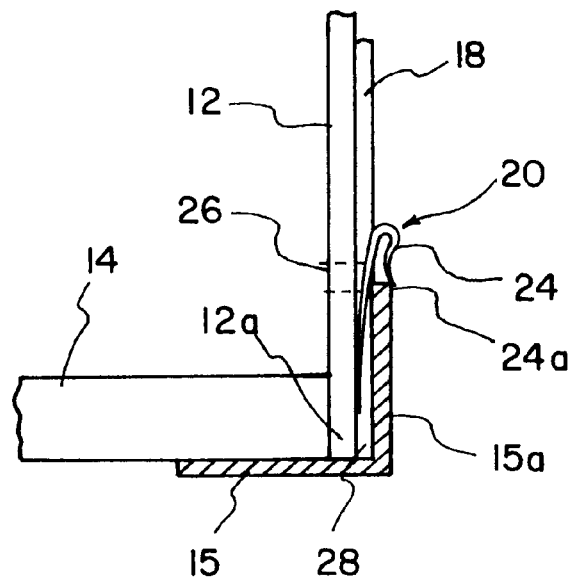
FIG. 6 is a sectional view with the universal clip of the present invention supporting a screen guard on a television.

FIG. 6 is a cross-sectional view of frame 15 and housing 14 of a projection-type television set wherein the present universal clip 20 is installed. In an installation procedure for the present invention, the clip 20 is cut to the desired length corresponding approximately to the internal periphery of the screen frame 15.

Next, the screen guard 18 being pre-cut to a predetermined dimension so as to leave the appropriate gap as at 26 measuring $1/16^{th}$–$1/8^{th}$ inch is centered on the screen 12 and manually held in this position.

Thereafter, the leading edge 21a of the clip body 21 is inserted intermediate the screen 12 and the inside face 15a of the frame 15 overlapping peripheral edge 12a of the screen 12 as shown in FIG. 6. The clip 20 is advanced into the groove 28 between the screen 12 and the frame 15 until the short leg portion 24 contacts the frame 15 providing a finished appearance.

Still referring to FIG. 6, it will be noted that the opposite end of the clip 20 adjacent the radius overlaps the peripheral edge of the screen guard 18 approximately ¼ inch to secure the screen guard in position.

In those instances where the depth of the groove 28 is insufficient to accommodate the fall width of the clip 20, the leading edge 21a thereof may be trimmed off using ordinary household scissors to permit full insertion.

Figure 7:
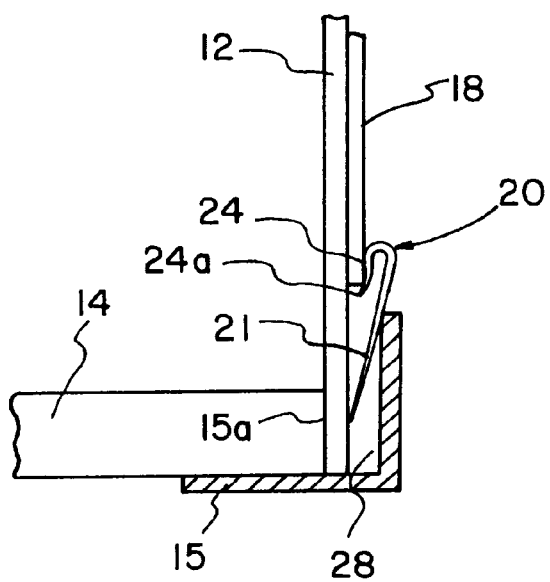
FIG. 7 is a sectional view showing the clip reversed on a different model television that has a wider groove between the frame and the screen.

A novel aspect of the present invention allows the clip 20 to be reversed prior to its insertion within the groove 28 such that the short leg portion 24 engages the peripheral edge of the screen guard 18 as shown in FIG. 7. It will be appreciated by those skilled in the art that the short leg portion 24 is inherently spring-biased away from the body portion 21 of the clip and, thus, is slightly compressed in this position to accommodate the greater width of the groove 28 enabling it to retain the screen guard 18 in position.

Figure 8:
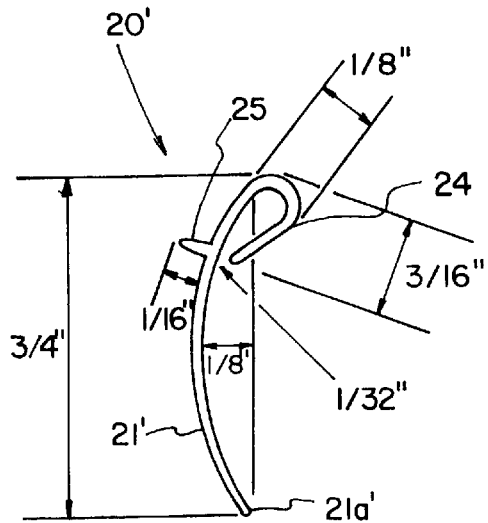
FIG. 8 is an end elevational view of an improved screen guard clip.

With reference to FIG. 8, a preferred embodiment is shown of the present clip, indicated generally at 20'. Although generally similar in construction to the, embodiment described hereinabove, the clip 20' includes modifications which make it preferable in most applications. In this version the clip 20' is fabricated from a polycarbonate material and the body portion 21' is arcuate in cross-section which facilitates insertion of the clip 20'.

On some big screen TV sets there is a tighter fit between the screen 12 and the frame 15. Because the preferred polycarbonate clip 20' is a stiffer material, the wall thickness can be reduced. The polycarbonate clip 20' resists bending and collapsing and the reduced wall thickness makes insertion between the frame and screen possible. The arcuate cross-section reduces the resistance the clip 20' undergoes as it is being inserted into the tighter space between the screen and frame. In addition, the arcuate cross-section makes the installation process easier because the clip 20' has to curve around the edge of the frame 15 as it is being installed.

It will be noted that in this embodiment the clip 20' includes a locking tab portion 25 which can be pushed into the gap as at 26 between the screen guard 18 and the frame 15 to lock the clip 20' in place or the tab 25 can be positioned against the screen guard 18 when the clip 20' is installed. Another function of the tab 25 is to act as a stop when the clip 20' is installed in reverse as hereinafter in described in greater detail.

In addition, it will be noted that the terminal end 24a of the short leg portion 24 has been omitted in this preferred embodiment.

Figure 10:
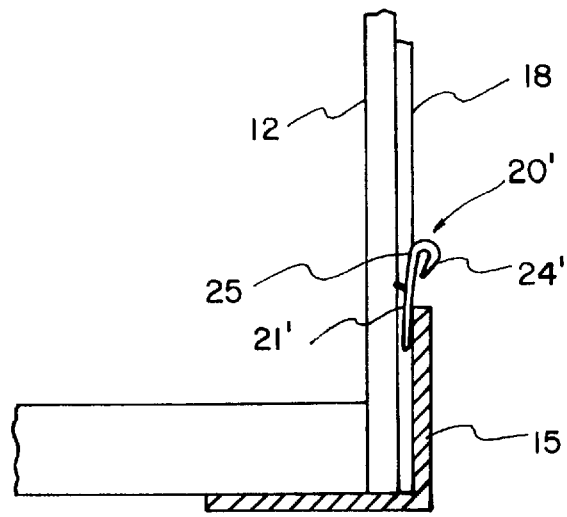
FIG. 10 is a sectional view taken through lines 10—10 of FIG. 9.

It will be appreciated by those skilled in the art that the preferred embodiment 20' is installed as shown in FIG. 10 in a manner substantially similar to that hereinabove described and illustrated in FIG. 6. Further, the preferred clip 20' is reversible as hereinabove described. In a reverse position of the clip 20', the arcuate cross-section is compressed as the clip is inserted between the frame and screen and thus is spring-biased outwardly against the inner face 15a of the frame 15 as it is installed.

Figure 9:
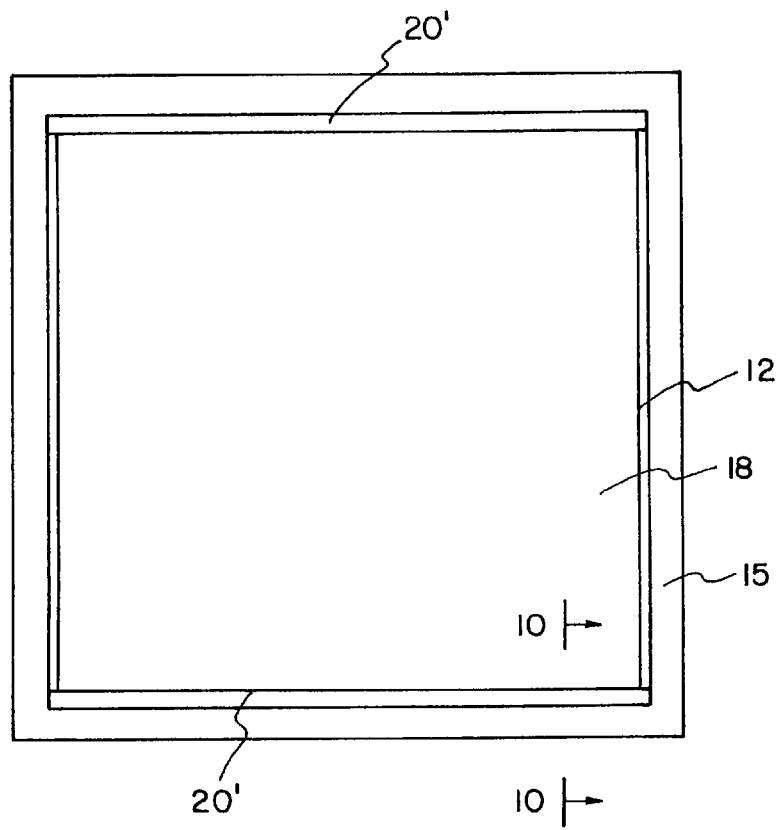
FIG. 9 is a front elevational view showing upper and lower screen guard clips in place and the screen guard correctly positioned over the television screen.
Figure 12:
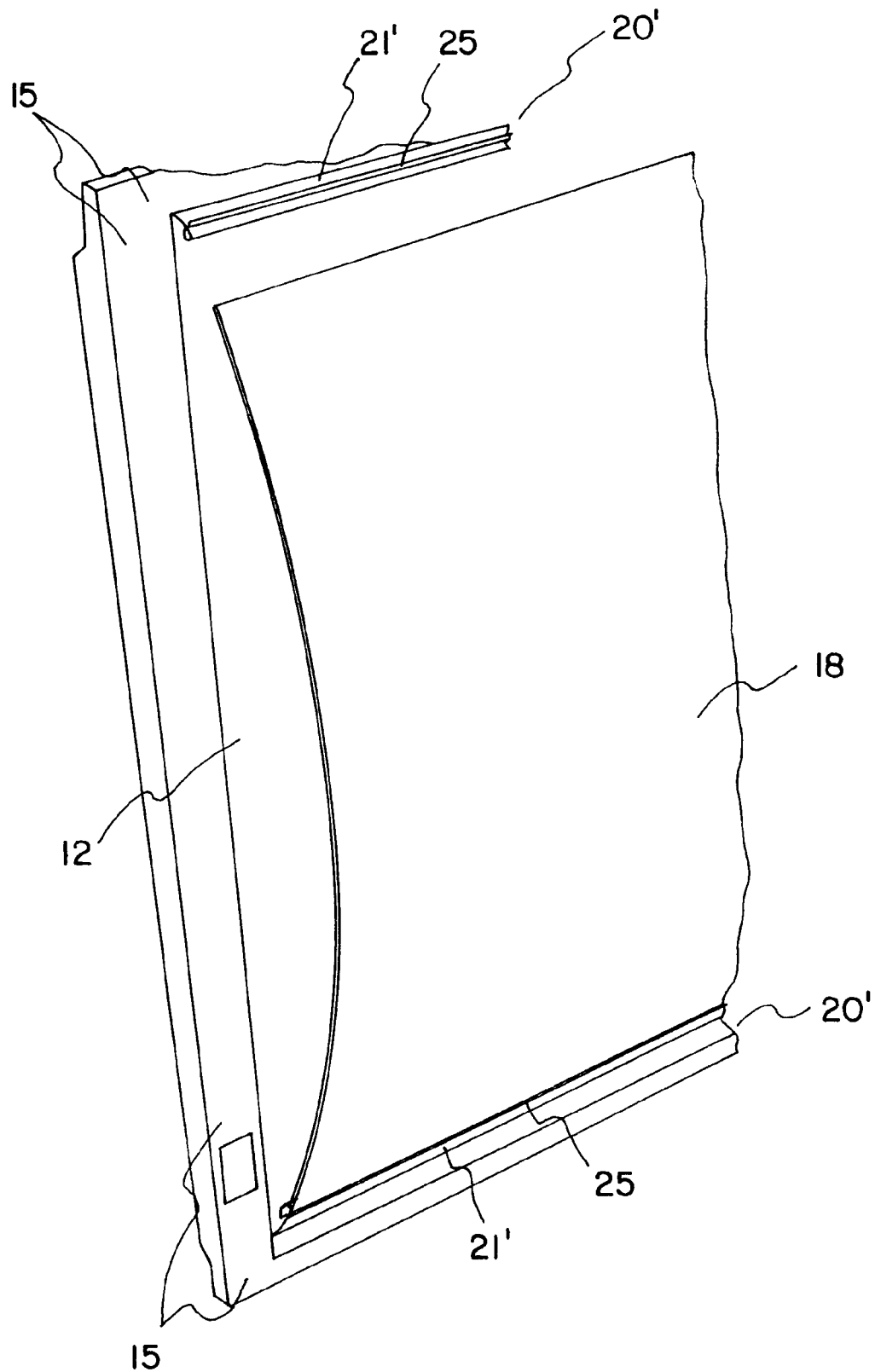
FIG. 12 is a perspective view of the screen guard being installed between the lower and upper clips.

FIG. 9 is a front elevational view of a projection type television with the lower and upper clips 20' installed between the screen 12 and the frame 15. The lower edge of the screen guard 18 is inserted between the clip 20 and the projection screen 12. It is then bowed as shown in FIG. 12 and the upper edge of such screen guard is again inserted between the upper clip 20' and the projection screen 12.

Figure 11:
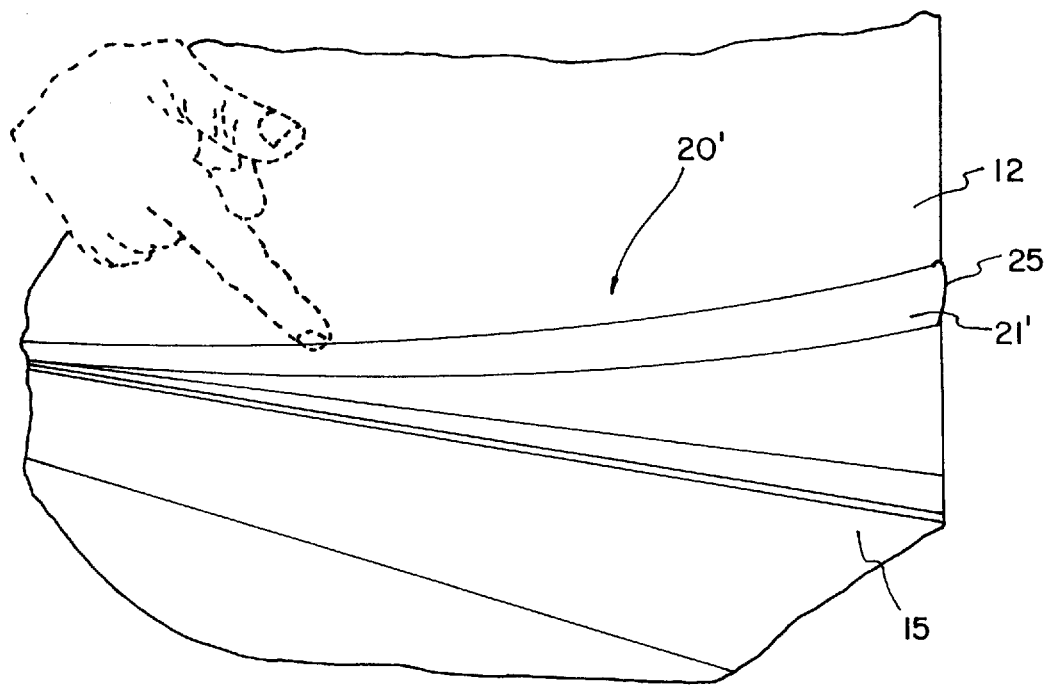
FIG. 11 is a perspective view showing the bottom clip being installed.
Figure 13:
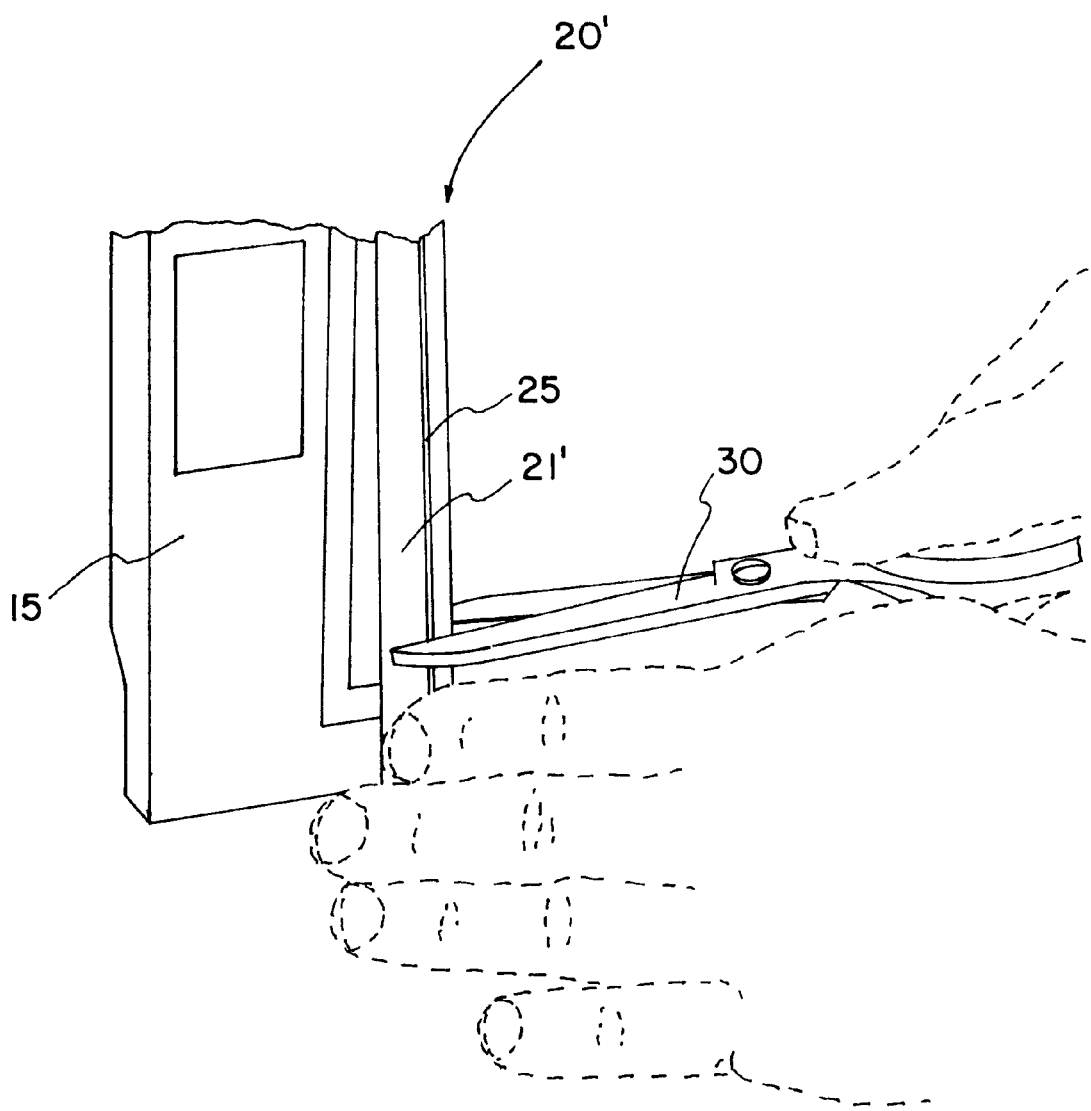
FIG. 13 is a perspective view of one of the side clips being trimmed to abut the lower clip.

When the screen guard 18 is installed as described above, a gap in the range of $\frac{1}{16}^{th}$ to $\frac{1}{8}^{th}$ of an inch is left on both sides as can clearly be seen in FIG. 9. The side clips are then installed as shown in FIG. 11 and are trimmed as shown in FIG. 13 to complete the simple and yet highly efficient and aesthetically pleasing screen guard installation. Should the screen guard itself become scratched or otherwise marred, the screen guard clip 20 or 20' can be readily removed and a new screen guard installed.

Figure 14:
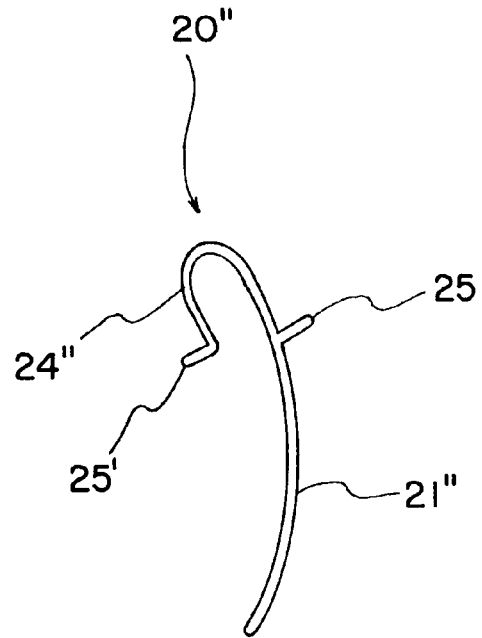
FIG. 14 is an end elevational view of a second improved screen guard clip.

A second improved clip of the present invention, indicated generally at 20", is shown in FIG. 14 and is basically the same as the improved clip 20' shown in FIG. 8 with the addition of a second longitudinal locking tab portion 25' extending outwardly from the short leg portion 24".

Figure 15:
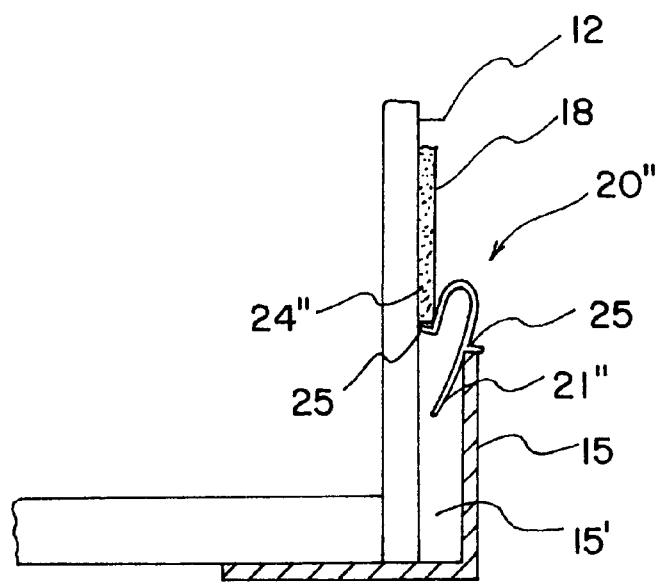
FIG. 15 is a sectional view showing the second improved clip of the present invention supporting a screen guard that is spaced from the frame.

When the space or gap 15' between the television screen 12 and the screen frame 15 is substantially greater than the thickness of the screen guard 18, the second improved clip 20" can be used to compensate for this as clearly shown in FIG. 15.

From the above it can be seen that the present invention provides a screen guard clip that is versatile, cost effective and makes after-market installation of screen guard a simple task. The present clip provides a universal fit for big screen televisions of various manufacturers, thus providing consumers with an after-market screen guard installation means at a reasonable price.

The terms "upper", "lower", "side" and so forth have been used herein merely for convenience to describe the present invention and its parts as oriented in the drawings. It is to be understood, however, that these terms are in no way limiting to the invention since such invention may obviously be disposed in The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of protecting the screen of a projection type television set operatively mounted within a housing and having a frame mounted on said housing and disposed about the periphery of said screen, said frame having an inwardly turned flange spaced forwardly of said screen with an inner peripheral surface defining an opening, said method comprising the steps of:

forming a plurality of elongated screen guard clips from a flexible material, each of said clips having a U-shaped cross-section including a pair of legs interconnected by a reversely turned longitudinal edge;

inserting at least a first clip rearwardly through said opening and inserting said legs outwardly between the projection screen and the peripheral frame of the housing;

providing a transparent screen guard having a peripheral size slightly less than said opening;

inserting said screen guard rearwardly through said opening and against said screen and one leg of said first clip and centering said screen guard with respect to said flange and said opening to provide generally equal spacing between the periphery of the screen guard and the internal periphery of the frame; and inserting additional screen guard clips rearwardly through said opening and inserting said legs of said clips inwardly between said screen guard and said flange with a hinge section disposed inwardly of said flange.

2. The method of claim 1, wherein said hinge section overlaps the screen and is visible through said opening.

3. The method of claim 2, wherein an outwardly turned longitudinal flange projection is provided on one arm of said clip that engages the periphery of the screen guard.

4. The method of claim 2, wherein an outwardly projecting longitudinal flange is provided on the other arm of said clip that engages the periphery of the screen frame.

5. The method of claim 2, wherein a longitudinal locking tab is provided on the clip to engage the periphery of the screen guard.

6. The method of claim 2, wherein a longitudinal locking tab is provided on the clip to engage the periphery of the screen frame.

7. The method of claim 1, wherein the clip is formed from a polycarbonate plastic material.

8. The method of claim 1, wherein the clip is formed from polyvinylchloride NP 57.

* * * * *